United States Patent [19]
Ishizaki

[11] Patent Number: 5,446,966
[45] Date of Patent: Sep. 5, 1995

[54] ANGULAR POSITION TRANSDUCER

[76] Inventor: Akira Ishizaki, No.22-5, Nagatakita 3-chome, Minami-ku, Yokohama-shi, Kanagawa, Japan

[21] Appl. No.: 182,570

[22] Filed: Jan. 18, 1994

[30] Foreign Application Priority Data

Jan. 19, 1993 [JP] Japan ................... 5-006326

[51] Int. Cl.⁶ .................... G01B 33/00; G01B 7/30
[52] U.S. Cl. .................... 33/1 PT; 318/605
[58] Field of Search ............. 33/1 N, 1 PT, 534, 536, 33/708; 318/605

[56] References Cited

U.S. PATENT DOCUMENTS

| | | | |
|---|---|---|---|
| 3,906,339 | 9/1975 | Leisterer | 33/1 PT |
| 4,216,466 | 8/1980 | Chasson et al. | 318/605 |
| 4,584,577 | 4/1986 | Temple | 33/1 N |
| 4,626,754 | 12/1986 | Habermann et al. | 318/605 |
| 5,025,201 | 6/1991 | Berger | 318/605 |
| 5,250,889 | 10/1993 | Ezuka | 318/605 |

*Primary Examiner*—William A. Cuchlinski, Jr.
*Assistant Examiner*—G. Bradley Bennett
*Attorney, Agent, or Firm*—Wenderoth, Lind & Ponack

[57] ABSTRACT

Disclosed is a high accuracy angular position transducer of simple constuction. The angular position transducer consists of a stator core in slots of which both exciting windings with $p_1$ pole pairs and output windings with $p_2$ pole pairs are wound, and a rotor core which carries no windings and has salient poles whose number is an integer N satisfying one of the following relations, $p_1+p_2=N$, or $p_1-p_2=\pm N$. In this construction the angular position is detected by using the following voltages induced in output windings: two or three phase voltages having a sinusoidal waveform of one cycle per rotation of 1/N of the circumference, in the combination of single phase exciting windings and two or three phase output windings; single phase voltage having a sinusoidal waveform whose phase shifts by $2\pi$ per rotation of 1/N of the circumference, in the combination of two phase exciting windings and single phase output windings.

24 Claims, 5 Drawing Sheets

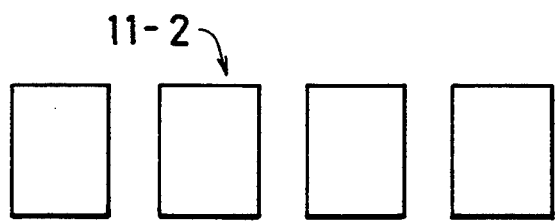
FIG.7A
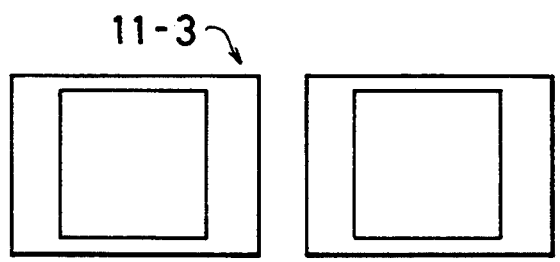
FIG.7B
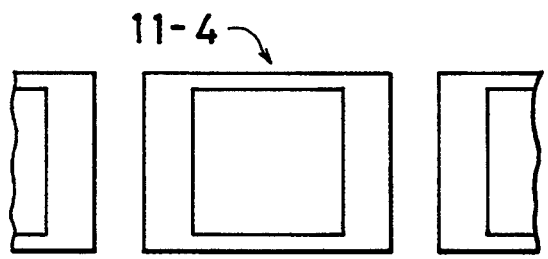
FIG.7C
FIG.8
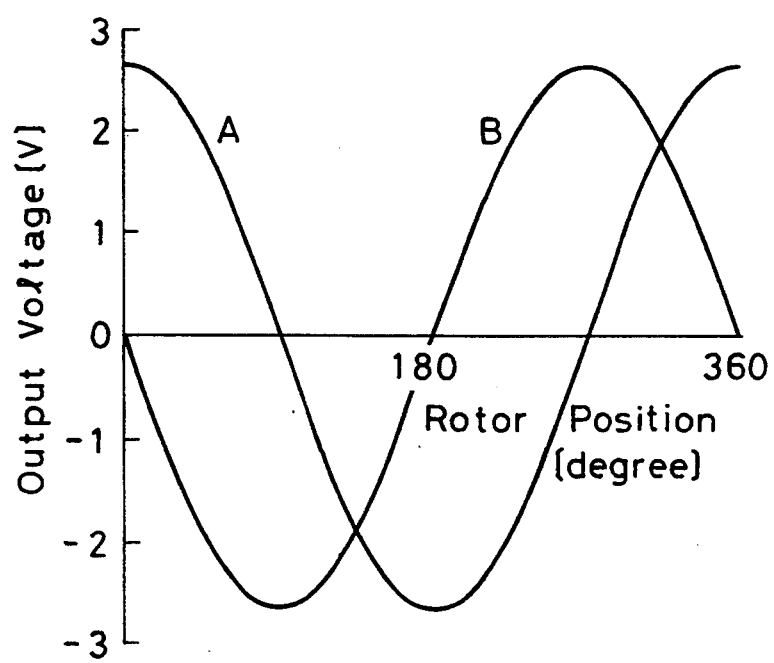

FIG.9

| 1st output windings | | 2nd output windings | |
|---|---|---|---|
| order | harmonic contents [%] | order | harmonic contents [%] |
| 3 | 0.2215 | 3 | 0.2216 |
| 5 | 0.0029 | 5 | 0.0024 |
| 7 | 0.0012 | 7 | 0.0003 |
| 9 | 0.0009 | 9 | 0.0011 |
| 11 | 0.0005 | 11 | 0.0009 |
| 13 | 0.0021 | 13 | 0/0011 |

ANGULAR POSITION TRANSDUCER

BACKGROUND OF THE INVENTION

The present invention relates to angular position transducers having simple and maintenance-free construction which can be widely used in the equipment requiring position control such as machine tools, robots, and factory automation machines.

Hitherto, rotary encoders, resolvers and synchros have been used as angular position transducers for the above mentioned equipment. However, optical rotary encoders increase the error when used in humid or dirty environments and are expensive, especially those of the absolute type. On the other hand, conventional brushless resolvers and synchros are also expensive due to their intricate construction, wherein a rotary transformer supplies current to the exciting coils wound on the rotor poles. In order to solve these problems, variable-reluctance resolvers and synchros requiring no rotary transformers, where both exciting and output coils are wound onto a stack of magnetic stator laminations and therefore the stack of rotor magnetic laminations carry no windings, have been investigated. However, until now variable-reluctance resolvers and synchros with high accuracy have not been put into practical use.

As stated above, the conventional resolvers and synchros are expensive due to the intricate construction wherein the rotary transformer supplies the exciting windings with the current, and the variable-reluctance ones of simple construction have not been widely used because of their inferior accuracy. Therefore, the most important problem involved with the variable-reluctance resolvers and synchros is how to improve the accuracy. In order to solve this problem, the angular position transducer based on a principle quite different from the conventional practice has been devised in the present invention. It will realize high accuracy but utilize a simple construction which consists of a stator core with both exciting and output windings and a rotor core carrying no windings.

The object of the present invention is to provide an angular position transducer with practically acceptable accuracy and a simple construction without windings on the rotor core.

SUMMARY OF THE INVENTION

As the harmonic components contained in the induced voltage in the output windings of the variable-reluctance resolvers and synchros cause the error, the present invention is intended to minimize them by a special construction based on a new principle and produce the results within practically acceptable accuracy.

The present invention consists of:
- a stack of magnetic stator laminations in slots of which are wound both exciting and output coils having different number of pair of pole represented by $P_1$ and $P_2$ respectively;
- a stack of rotor laminations, also of a magnetic material, which carries no windings and is characterized by the salient poles whose number is represented by an integer N satisfying one of the following equations $$p_1 + p_2 = N, \text{ or } p_1 - p_2 = \pm N$$

In this construction, the interaction between the magnetomotive force (hereafter abbriviated MMF) with $p_1$ pole pairs produced by exciting current and the fluctuation of gap permeance due to N salient poles induces the flux distribution with $p_2$ pairs of poles in the air gap, whose angular position moves $1/p_2$ per rotaion of $1/N$ of the circumference. Therfore, the following voltages are induced in the output windings by the air gap flux:

2 or 3 phase sinusoidal voltage whose amplitude has the variation of one cycle per rotation of $1/N$ of the circumference, in the case where they consist of single phase exciting windings and 2 or 3 phase output windings;

single phase sinusoidal voltage whose phase shift has the variation of $2\pi$ per rotation of $1/N$ of circumference, in the case where they consist of 2 phase exciting windings and single phase output windings.

Since the relationship between the induced voltage and rotor position with respect to the stator is the same as that of the conventional brushless resolvers or synchros, the rotor position can be detected by processing through the conventional resolver/digital converter.

As such a variation of the output voltage in the present invention is caused by the variation of the air gap permeance depending on the rotor position with respect to the stator, harmonic contents in the output voltage, cause of the error, are affected by the form of salient pole. Therefore, to minimize the error the present invention is characterized by such an outer surface form of the rotor core that the fluctuation part of normalized gap permeance, which means gap permeance per unit area, varies in proportion to $\cos(N \theta_2)$, where $\theta_2$ represents the angular position of a point in the air gap with respect to the origin on the rotor, the center of a salient pole.

In the case where N is an integer greater than 2, the position within $1/N$ of the circumference can be detected and improve the resolution, but it is necessary to use some supplementary method to detect the absolute position. Although the number of salient poles is usually even in the ordinary rotating machines, in this angular position transducer it can also be odd. On the other hand, the detection of the absolute position is possible in the case where N=1, because the induced voltage in the output windings varies as 1 cycle per 1 rotation.

The present invention shows that the case N=1 is realized by the outer surface form of the rotor core having the minimum gap at one side and the maximum gap at another side of a diameter. In this case the present invention is also characterized by the outer surface form of rotor core to minimize the error which makes the fluctuation part of gap permeance vary in proportion to $\cos(\theta_2)$.

The above and other objects, features, and advantages of the present invention will become more apparent from the following detailed description with reference to the drawings.

BRIEF DESCRIPTION OF THE DRAWINGS

FIGS. 7A, 7B and 7C are diagrams showing an example of winding forms and arrangement for the example of FIG. 5;

FIG. 8 is an example of simulated waveforms of output voltages for the core model shown in FIG. 5;

FIG. 9 is a tubulation of harmonic contents of the waveforms shown in FIG. 8.

DETAILED DESCRIPTION OF THE PREFERRED EMBODIMENT

Referring to FIG. 1 to FIG. 9, the present invention will be explained in detail with reference to a preferred embodiment thereof.

Figure 1:
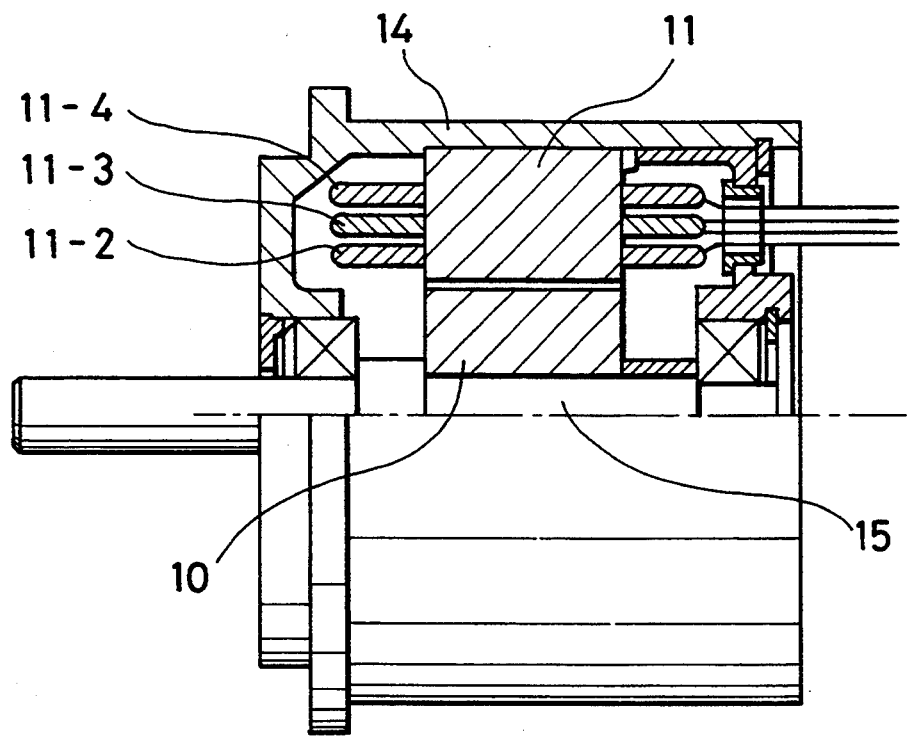
FIG. 1 is an axial sectional view of an angular position transducer.
Figure 2:
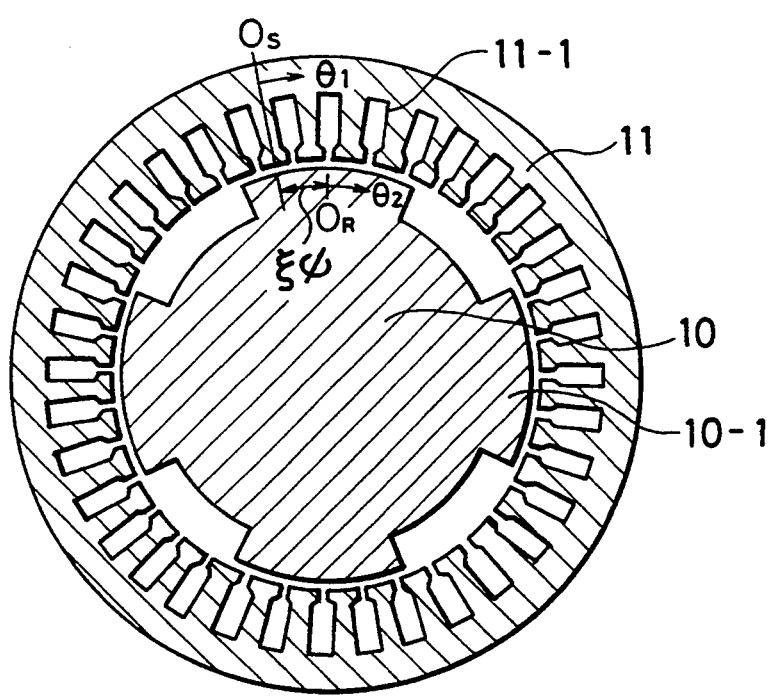
FIG. 2 is a cross-sectional view of stator and rotor cores for use in explaining the principle of the present invention.

FIG. 1 is an axial sectional view showing the overall construction which consists of a stator core 11, windings 11-2, 11-3 and 11-4 wound in slots of the stator core 11, the stator core 11 being supported by the frame 14 and the rotor core 10 mounted on the shaft 15. A cross-sectional view of the cores 10 and 11 is shown in FIG. 2. The slots 11-1 are arranged at equal intervals inside of the stator core, in which both exciting and output coils having different numbers of pairs of poles represented by $p_1$ and $p_2$, respectively, are wound. The number of the salient poles 10-1, is represented by N, and such poles are arranged at equal intervals outside of the rotor core 10. The present invention is characterized by the relationship among $p_1$, $p_2$ and N, such that one of the following equations must be satisfied $$p_1 + p_2 = N \quad (1)$$

$$p_1 - p_2 = \pm N. \quad (2)$$

The normalized gap permeance, which means gap permeance per unit area, in this construction varies in accordance the expression (3) depending on the coordinates $\theta_1$ and $\theta_2$ $$\sum_\alpha \sum_\gamma P_{\alpha\gamma} \cos(\alpha Z_1 \theta_1 + \gamma N \theta_2) \quad (3)$$

where the symbols used in this expression signify the following:

- $\theta_1$ and $\theta_2$ represent the angular positions of a point in the air gap with respect to the origin $O_S$ on the stator and the origin $O_R$ on the rotor respectively, where the origin $O_S$ is set at the middle point of a stator tooth between two adjacent exiciting coils, and the origin $O_R$ is at the center of the nearest salient pole to the origin $O_S$;
- $\alpha$ and $\gamma$ are positive and negative integers including zero;
- $Z_1$ is the number of stator slots.

If the space angle between both the origins $O_S$ and $O_R$ is represented by $\xi\phi$, where $\phi$ designates the space angle corresponding to one pole pitch of the rotor salient pole, it is clear that the following relation exists between the coordinates $\theta_1$ and $\theta_2$ $$\theta_2 = \theta_1 - \xi\phi \quad (4)$$

wherein $-0.5 \leq \xi \leq 0.5$. Substituting the equation (4) into the expression (3), the normalized gap permeance is generally represented by the expression (5)

$$\sum_\alpha \sum_\gamma P_{\alpha\gamma} \cos\{(\alpha Z_1 + \gamma N)\theta_1 - \gamma\xi N\phi\} \quad (5)$$

The fundamental MMF produced by the exciting current whose effective value and radian frequency are represented by I and $\omega$ respectively is expressed by $$F_1 = \frac{\sqrt{2} \cdot W_e k_{w1} I}{p_1 \pi} \cos(\omega t) \cdot \sin(p_1 \theta_1) \quad (6)$$

where $W_e$ is number of turns, $K_{w1}$ is the winding factor for the fundamental component, and $p_1$ is number of pole pairs of the exciting windings.

Neglecting the fluctuation of the gap permeance due to the openings of the stator slots to explain the principle of the present invention, it corresponds to the case $\alpha = 0$ and the expression (5) becomes $$\sum_\gamma P_{\alpha\gamma} \cos(\gamma N \theta_1 - \gamma\xi N\phi) \quad (7)$$

The flux density distribution in the air gap can be obtained by the product of the expressions (6) and (7), and represented as the expression (8)

$$B_{11} = \frac{\sqrt{2} \cdot W_e k_{w1} I}{p_1 \pi} \cos(\omega t) \times \quad (8)$$

$$\sum_\gamma P_{0\gamma} \sin\{(p_1 + \gamma N)\theta_1 - \gamma\xi N\phi\}$$

Studying ($p_1 + \gamma N$), the orders of space distribution of the air gap flux density, it becomes clear that there exist the following relations:

($p_1 + \gamma N$) = $p_1$ when $\gamma = 0$;

($p_1 + \gamma N$) = $-p_2$ when $\gamma = -1$ and ($p_1 + \gamma N$) = (2$p_1 + p_2$)

when $\gamma = 1$, in the case where the relation (1) is satisfied;

($p_1 + \gamma N$) = $p_2$ when $\gamma = +1$ and ($p_1 + \gamma N$) = (2$p_1 - p_2$)

when $\gamma = \pm 1$, in the case where the relation (2) is satisfied.

Therefore, the flux density in the air gap can be expressed by the following equations (9) or (10) respectively corresponding to the cases where relation (1) or (2) is satisfied:

$$B_{11} = \frac{\sqrt{2} \cdot W_e k_{w1} I}{p_1 \pi} \cos(\omega t) [P_{00} \sin(p_1 \theta_1) - \quad (9)$$

$$P_{01} \sin(p_2 \theta_1 - \xi N\phi) + P_{01} \sin[(2p_1 + p_2)\theta_1 - \xi N\phi]]$$

$$B_{11} = \frac{\sqrt{2} \cdot W_e k_{w1} I}{p_1 \pi} \cos(\omega t) [P_{00} \sin(p_1 \theta_1) + \quad (10)$$

$$P_{01} \sin(p_2 \theta_1 \pm \xi N\phi) + P_{01} \sin[(2p_1 + p_2)\theta_1 \pm \xi N\phi]]$$

Examination of the sine function of the second term in the right side of the expression (9) and (10) shows that the flux distribution with $p_2$ pole pairs moves by its one pair of poles for the variation from $-0.5$ to $0.5$ of $\xi$, i.e. for the rotation of one pole pitch of the salient pole, since $N\phi = 2\pi$. This fact means that the interlinkage with the output windings having $p_2$ pole pairs by this flux varies depending on the rotor position, and the induced voltage in the output windings also has the variation of one cycle per rotation of one pole pitch of the salient pole. In the case of two phase output windings, the ones named the first output windings are put in the position that their winding axis coincides with that of the exciting windings, and the other ones named the second windings are put in a position spaced 90 electrical degrees from the first ones.

Each term on the right side in the expressions (9) or (10) showing the air gap flux densities induces the following voltages in the first and second output windings:

the first term induces only the first output windings with the constant voltage independent of the rotor position when $p_1/p_2$ is odd;

the second term induces the first and the second output windings with the voltages represented by the expression (11) and (12) respectively $$e_{d1} = \sqrt{2} \cdot E_1 \cos(\xi N\phi) \cdot \sin(\omega t) \tag{11}$$

$$e_{d2} = -\sqrt{2} \cdot E_1 \sin(\xi N\phi) \cdot \sin(\omega t) \tag{12}$$

the third term induces the first and the second output windings with the same voltages as the expression (11) and (12), respectively, except for the effective value $E_1$ when $(2p_1+p_2)/p_2$ is odd.

The constant voltage induced by the first term can be removed by a proper electrical network, and it also disappears when a combination of $p_1$ and $p_2$ is such that $p_1/p_2$ becomes even. And it is no problem if the third term induces the voltages in the output windings, because it only changes the effective value of the expressions (11) and (12).

Although the air gap flux components whose order of special distribution is a multiple of odd times $p_2$ can generally induce the voltages in the windings with $p_2$ pole pairs, those having the order of a multiple of $3p_2$ do not induce the voltage between the terminals of three phase star connected output windings. If single phase windings or one phase of two phase windings are connected as 12 and 13 shown in FIG. 3 which are U- and V-phase windings in three phases, the fact mentioned above for three phase windings can also apply in this case. It makes easy the selection of a combination between $p_1$ and $p_2$ not which will induce the voltage by the first term of the expression (9) and (10).

The induced voltages of the first and second output windings in the present invention are in proportion to cosine and sine functions having one cycle per rotation of one pole pitch of the salient pole, as shown by the expressions (11) and (12). As these output voltages are identical with the ones of the conventional brushless resolver, the position can be detected by using a resolver/digital converter. The explanation of the invention has thus far described the principle of how to detect the position in the present invention.

Although it thus far has been described that the first output windings are arranged at the same location as the exciting windings for convenience of explanation, it is not necessary to use this arrangement. The two phase output windings can generally be arranged at any position of the stator slots, as far as they maintain the locations spaced apart by 90 electrical degrees from each other.

In the case of the combination of three phase output windings and single phase exciting windings, three phase voltages having one cycle per rotation of one pole pitch of the salient pole are induced in the output windings, which makes it possible to use in the same manner as the conventional brushless synchros. Although one phase of the output windings is also arranged at the same location as the exciting windings in many cases, three phase windings can be generally arranged in any position of the stator slots, as far as they maintain the locations spaced apart by 120 degrees from each other.

In the combination of single phase output windings and two phase exciting windings, the voltage is induced in the output windings whose phase shifts by $2\pi$ per rotation of one pole pitch of the salient pole. So the position detection in this case can also be implemented by using the resolver/digital converter in the same manner as for the conventional brushless resolvers.

So far the theory has been described for the simplified case where $\alpha=0$, $\gamma=\pm 1$, and only the fundamental MMF is explained in the principle of the present invention. Hereafter the theory will be described in some detail based on the exact expression of the air gap flux density as follows:

$$B_1 = \sum_n \sum_\alpha \sum_\gamma (-1)^l \frac{\sqrt{2} \cdot W_e K_{w1} I}{n P_1 \pi} \cos(\omega t) \times \tag{13}$$

$$P_{\alpha\gamma}\sin\{(np_1 + \alpha Z_1 + \gamma N)\theta_1 - \gamma\xi N\phi\}$$

In this expression, the harmonic MMF whose order is shown by $n=1+6l$ where $l$ is an integer, the permeance fluctuation due to stator slots shown by $\alpha Z_1$, and the effect of the rotor outer surface form shown by $\gamma N$ are fully considered. The output voltage can be induced by the components in the air gap flux densities shown by the expression (13) whose orders $(np_1+\alpha Z_1+\gamma N)$ are odd multiples of $p_2$, and moreover by only the components having orders other than multiples of 3 from them in the case of the winding connection shown by FIG. 3.

The induced voltages in the first and second output windings can be deduced by considering the above mentioned conditions for the expression (13) and represented by the expressions (14) and (15), respectively, $$e_{d1} = \sum\sum_\gamma \cos(\gamma\xi N\phi) \cdot \sin(\omega t) \tag{14}$$

$$e_{d2} = \sum\sum_\gamma \sin(\gamma\xi N\phi) \cdot \sin(\omega t) \tag{15}$$

The value of $\gamma$ in these expressions gives the following effect on the output voltages. At first in the case of $\gamma=0$, the orders of flux densities are expressed as $(np_l+\alpha Z_1)$. However, in this case the same combination between $p_1$ and $p_2$ as mentioned previously makes possible to induce no voltage in the output windings by these flux components. Because $Z_1$ is an even multiple of $p_1$ in the popular case of integer slot windings.

The output voltages induced by the flux densities corresponding to $\gamma=\pm 1$ are represented by the same formula as the expressions (11) and (12), except that the magnitude of $E_1$ is not the same since the harmonic components are considered in this case. The expressions (11) and (12) show that the voltages in proportion to cosine and sine function having one cycle per rotation of one salient pole pitch are induced in the first and second output windings, respectively, and these make it possible to detect the rotor position.

Figure 3:
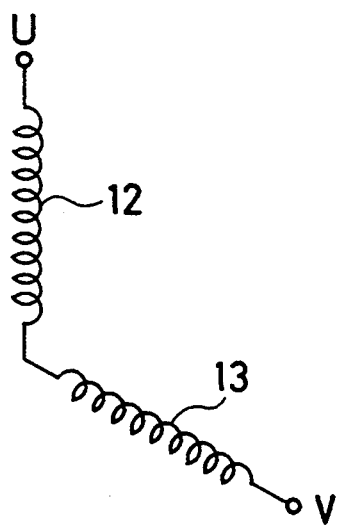
FIG. 3 is a schematically view showing an example of windings used in the present invention.

For $\gamma = \pm 2$, if there are flux densities whose order $(np + \alpha Z \pm 2N)$ is an odd multiple of $p_2$, except multiples of 3 in connection with FIG. 3, they induce the voltages in proportion to $\cos(2\xi_N\phi)$ and $\sin(2\xi_N\phi)$ in the first and second windings, respectively, which become harmonic components of the available voltages for detection of the rotor position. Therefore, as the flux densities having orders corresponding to $\gamma$ whose absolute value is greater than 2 induce the output windings harmonic voltages causing error, it is necessary to minimize these components for accurate position detection. That is, it means that the normalized gap permeance represented by the expression (16) should be realized to minimize the error $$P_{00} + P_{01}\cos(N\theta_2) \tag{16}$$

In this case, as there is no flux densities having orders corresponding to an absolute value greater than 2 of $\gamma$, the voltages represented by the expressions (11) and (12), except for the constant voltage which is independent of the rotor position and can be removed by an electrical network, are induced in the output windings and it makes possible the accurate position detection. The problem is how to embody the best form of rotor outer surface that can realize the normalized gap permeance represented by the expression (16). It has been made clear by theoretical study that the best form can be obtained by taking $R\theta_2$, the distance between a point of the coordinates $\theta_2$ on the outer surface and the center of the rotor, in accordance with following expression $$R_{\theta 2} = R_1 - \frac{\delta_0}{1 + \left(\frac{\delta_0}{\delta_1} - 1\right)\cos(N\theta_2)} \tag{17}$$

Figure 4:
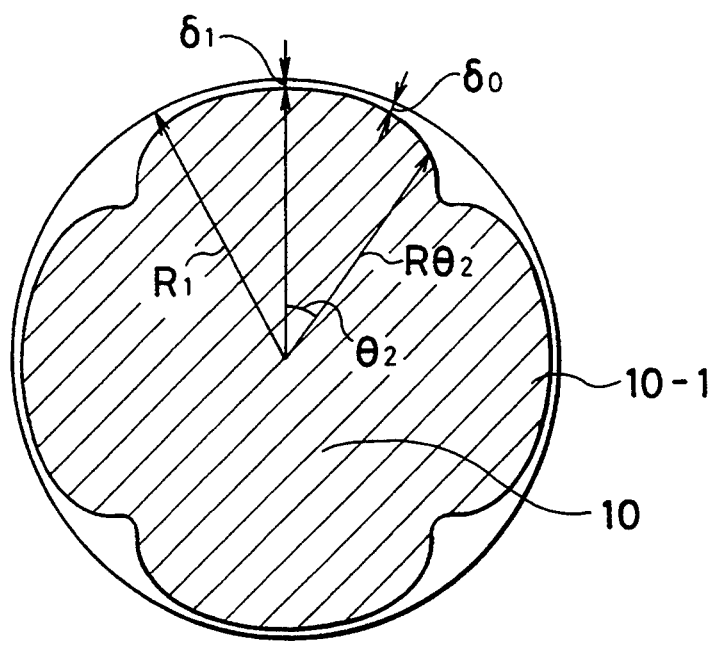
FIG. 4 is a cross-sectional view of the rotor core showing an example of a salient pole form devised to reduce harmonic contents of induced output voltages in the present invention.

The symbols in this expression represent the dimensions shown in FIG. 4 which shows an example of the rotor outer surface form for $N=4$, i.e. $R_1$ is the radius of the inner surface of the stator core, $\delta_1$ is the air gap length at $\theta_2 = 2h\pi/N$, the minimum air gap, and $\delta_0$ is the air gap at $\theta_2 = (1+2h)\pi/2N$, where h is an integer from 0 to $N-1$. Therefore, the form of rotor outer surface can be fixed by determining the value of $\delta_0$ and $\delta_1$. The gap permeance coefficients $P_{00}$ and $P_{01}$ in this case are represented by the following expressions $$\left. \begin{array}{l} P_{00} = \dfrac{\mu_0}{\delta_0} \\[6pt] P_{01} = \left(\dfrac{\delta_0}{\delta_1} - 1\right) \cdot P_{00} \end{array} \right\} \tag{18}$$

It is obvious from the expressions (18) that $P_{00}$ is determined by $\delta_0$ and $P_{01}/P_{00}$ by $\delta_0/\delta_1$, and in this case the normalized gap permeance can be represented by the expression (16). However, the terms corresponding to the absolute value greater than 2 of $\gamma$ may be contained in the normalized gap permeance of the rotor core formed by the expression (17), because it has been deduced under the assumption that flux lines run radially in the air gap.

In the case where the terms corresponding to the absolute value greater than 2 of $\gamma$ in the gap permeance become of a harmful magnitude, it is possible to correct the form of rotor outer surface by optimization using the results of magnetic field analysis by a finite element method to minimize these terms. As such a correction for the rotor form, if necessary, makes it possible to realize the desired gap permeance expression (16), the scheme of the present invention can generate the output voltages necessary for accurate position detection, i.e. sinusoidal waveforms with little harmonic contents.

Figure 5:
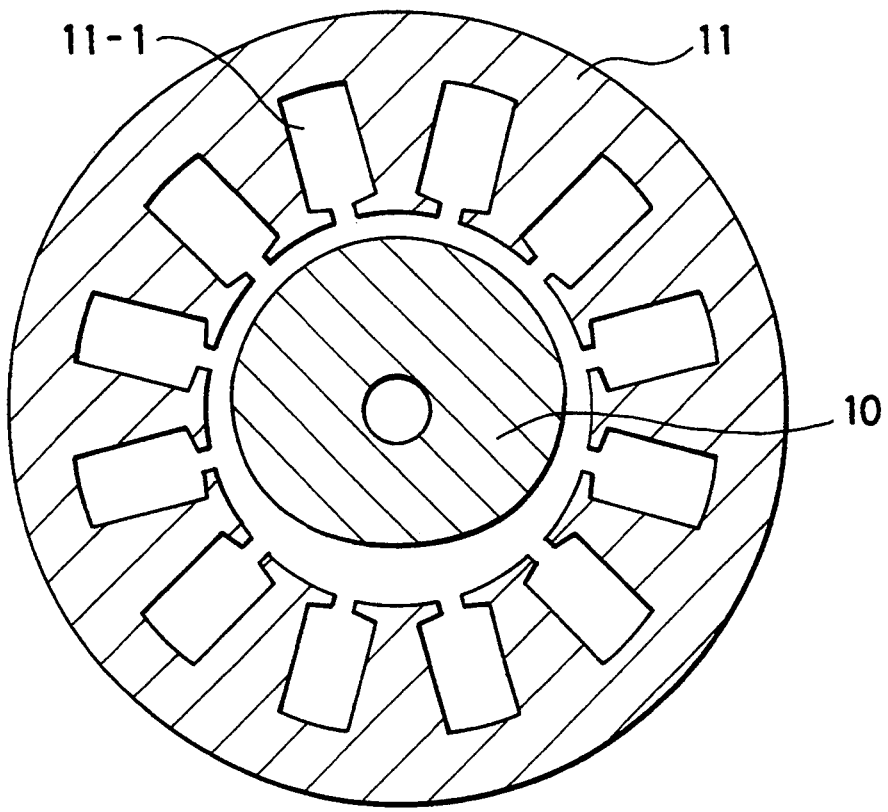
FIG. 5 is a cross-sectional view of an example of stator and rotor cores in the present invention.

The general case that N is an arbitrary integer has been described in the previous explanation. However, as the case $N=1$ by which it is possible to detect the absolute position is very important, an example of this case will be explained with reference to FIG. 5, FIG. 6, and FIG. 7A–7C. FIG. 5 shows a cross-sectional view of the cores, where the rotor core 10 has the outer surface form based on the expression (17) for $N=1$, and the stator core 11 has slots 11-1 in which both the exciting and output coils are received.

Figure 6:
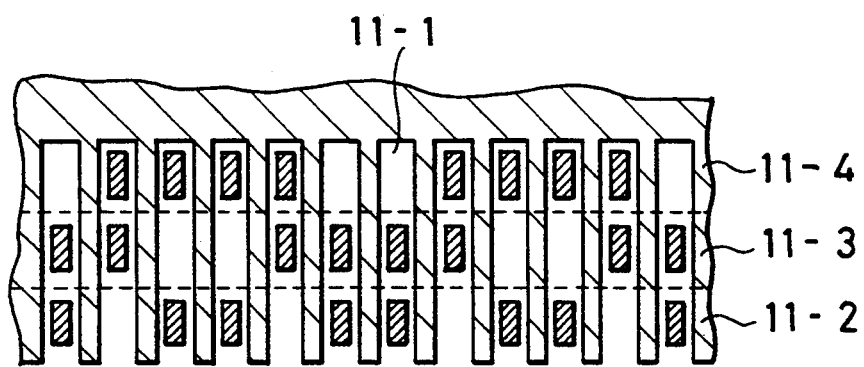
FIG. 6 is a developed diagram showing an example of windings arranged in the slots of the stator core of the example of FIG. 5.

FIG. 6 shows the arrangement of each coil put into the slots 11-1 represented by the developed diagram, where the exciting coils 11-2 are arranged at the nearest part to slot openings, the first output coils 11-3 at the middle part, and the second output coils 11-4 at the bottom part of the slots. In this case, as the exciting coils are wound as 4 poles and the output coils as 2 poles, the relation shown by the equation (2) is satisfied with $p_1=2$, $p_2=1$, and $N=1$. Each in the windings are single phase connected as in FIG. 3, and are wound by a single layer equivalent to a double layer to shorten coil ends. The shortening of coil ends is effective to cause miniaturization of the external dimensions, since resolvers have generally short core lengths.

FIG. 7A, FIG. 7B, and FIG. 7C show the coil forms and spatial arrangements of each of the windings, where 11-2 is 4 pole exciting windings, 11-3 and 11-4 are the first and second output windings having 2 poles and spaced apart by 90 degrees from each other.

In this example, the voltages induced in the first output windings 11-3 and the second ones 11-4 are in proportion to $\cos(\phi)$ and $\sin(\phi)$, respectively, where $\phi$ shows the space angle from the origin set on the stator to the minimum gap point, so the absolute position can be detected, in the same manner as the conventional brushless resolvers, by processing these voltages through the resolver/digital converter.

FIG. 8 shows an example of the induced voltage waveforms for the model with the cores shown by FIG. 5 which have been obtained by the simulation using finite element magnetic field analysis in the case excited by 0.01[A], 3[kHz] current, where A and B are the voltages of the first and second windings, respectively. FIG. 9 shows the harmonic contents, the percentages of harmonic voltages relative to the fundamental, in these waveforms. These results prove the validity of the present invention, because it is theoretically deduced that the 0.221[%] third harmonic voltage causes only 7.6 minutes position error in the case of processing by the resolver/digital converter.

Although the above explanation has been made for the conventional inner rotor construction, it is also a matter of course to be able to make the rotor outside the stator.

As described above, the present invention can provide inexpensive and highly accurate resolvers and synchros, because the output voltages which have nearly perfect cosine and sine waveforms of one cycle per rotation of one pole pair of salient poles can be obtained by the simple construction which consists of the stator having both exciting and output windings and the salient pole rotor carrying no windings. Since N is the number of salient poles, NX resolver and NX synchro for N of an arbitrary integer can be produced easily, and 1X resolver and 1X shnchro that are most popular for detecting the absolute position can also be produced in accordance the simple construction of the present invention.

The conventional brushless resolvers and synchros were intricate in construction and expensive, because the rotary transformer must be used to supply the current to the exciting windings wound on the rotor poles. The present invention can offer reliable and inexpensive resolvers or synchros without requiring rotary transformers, so it is possible to economically control various industrial equipment such as machine tools, robots, and factory automation machines.

What is claimed is:

1. An angular position transducer comprising:
   a stator having exciting windings and output windings enclosed in slots formed in an iron core, said exciting windings having a first number of pole pairs, and said output windings having a second number of pole pairs different than said first number of pole pairs; and
   a rotor with no windings and which is constructed by only an iron core having a number of salient poles equal to a sum of the first number of pole pairs and the second number of pole pairs;
   wherein said angular position transducer has a combination of the exciting winding of a single phase and the output windings of two phases.

2. A transducer according to claim 1, wherein in the case where the center of one of said salient poles is set as an origin, and a space angle indicative of the position on the outer periphery of the rotor is set to $\theta_2$, said rotor has a shape such that a gap permeance fluctuation is in proportion to $\cos(N\theta_2)$.

3. A transducer according to claim 1, wherein a first air gap length at one point on the outer periphery of said rotor constitutes a minimum air gap length, and a second air gap length at a point on the side opposite of a diameter which passes through said one point constitutes a maximum air gap length, thereby enabling the absolute position to be detected as a rotor shape corresponding to $N=1$.

4. A transducer according to claim 2, wherein a first air gap length at one point on the outer periphery of said rotor constitutes a minimum air gap length and a second air gap length at a point on the side opposite of a diameter which passes through said one point constitutes a maximum air gap length, thereby enabling the absolute position to be detected as a rotor shape corresponding to $N=1$.

5. An angular position transducer comprising:
   a stator having exciting windings and output windings enclosed in slots formed in an iron core, said exciting windings having a first number of pole pairs, and said output windings having a second number of pole pairs different than said first number of pole pairs; and
   a rotor with no windings and which is constructed by only an iron core having a number of salient poles equal to a sum of the first number of pole pairs and the second number of pole pairs;
   wherein said angular position transducer has a combination of the exciting winding of a single phase and the output windings of three phases.

6. A transducer according to claim 5, wherein in the case where the center of one of said salient poles is set as an origin, and a space angle indicative of the position on the outer periphery of the rotor is set to $\theta_2$, said rotor has a shape such that a gap permeance fluctuation is in proportion to $\cos(N\theta_2)$.

7. A transducer according to claim 5, wherein a first air gap length at one point on the outer periphery of said rotor constitutes a minimum air gap length, and a second air gap length at a point on the side opposite of a diameter which passes through said one point constitutes a maximum air gap length, thereby enabling the absolute position to be detected as a rotor shape corresponding to $N=1$.

8. A transducer according to claim 6, wherein a first air gap length at one point on the outer periphery of said rotor constitutes a minimum air gap length and a second air gap length at a point on the side opposite of a diameter which passes through said one point constitutes a maximum air gap length, thereby enabling the absolute position to be detected as a rotor shape corresponding to $N=1$.

9. An angular position transducer comprising:
   a stator having exciting windings and output windings enclosed in slots formed in an iron core, said exciting windings having a first number of pole pairs, and said output windings having a second number of pole pairs different than said first number of pole pairs; and
   a rotor with no windings and which is constructed by only an iron core having a number of salient poles equal to a sum of the first number of pole pairs and the second number of pole pairs;
   wherein said angular position transducer has a combination of the exciting windings of two phases and the output winding of a single phase.

10. A transducer according to claim 9, wherein in the case where the center of one of said salient poles is set as an origin, and a space angle indicative of the position on the outer periphery of the rotor is set to $\theta_2$, said rotor has a shape such that a gap permeance fluctuation is in proportion to $\cos(N\theta_2)$.

11. A transducer according to claim 9, wherein a first air gap length at one point on the outer periphery of said rotor constitutes a minimum air gap length, and a second air gap length at a point on the side opposite of a diameter which passes through said one point constitutes a maximum air gap length, thereby enabling the absolute position to be detected as a rotor shape corresponding to $N=1$.

12. A transducer according to claim 10, wherein a first air gap length at one point on the outer periphery of said rotor constitutes a minimum air gap length and a second air gap length at a point on the side opposite of a diameter which passes through said one point constitutes a maximum air gap length, thereby enabling the absolute position to be detected as a rotor shape corresponding to $N=1$.

13. An angular position transducer comprising:
   a stator having exciting windings and output windings enclosed in slots formed in an iron core, said exciting windings having a first number of pole pairs, and said output windings having a second number of pole pairs different than said first number of pole pairs; and a rotor with no windings and which is constructed by only an iron core having a number of salient poles equal to a difference between the first number of pole pairs and the second number of pole pairs;

wherein said angular position transducer has a combination of the exciting winding of a single phase and the output windings of two phases.

14. A transducer according to claim 13, wherein in the case where the center of one of said salient poles is set as an origin, and a space angle indicative of the position on the outer periphery of the rotor is set to $\theta_2$, said rotor has a shape such that a gap permeance fluctuation is in proportion to $\cos(N\theta_2)$.

15. A transducer according to claim 13, wherein a first air gap length at one point on the outer periphery of said rotor constitutes a minimum air gap length, and a second air gap length at a point on the side opposite of a diameter which passes through said one point constitutes a maximum air gap length, thereby enabling the absolute position to be detected as a rotor shape corresponding to $N=1$.

16. A transducer according to claim 14, wherein a first air gap length at one point on the outer periphery of said rotor constitutes a minimum air gap length and a second air gap length at a point on the side opposite of a diameter which passes through said one point constitutes a maximum air gap length, thereby enabling the absolute position to be detected as a rotor shape corresponding to $N=1$.

17. An angular position transducer comprising:

a stator having exciting windings and output windings enclosed in slots formed in an iron core, said exciting windings having a first number of pole pairs, and said output windings having a second number of pole pairs different than said first number of pole pairs; and a rotor with no windings and which is constructed by only an iron core having a number of salient poles equal to a difference between the first number of pole pairs and the second number of pole pairs;

wherein said angular position transducer has a combination of the exciting winding of a single phase and the output windings of three phases.

18. A transducer according to claim 17, wherein in the case where the center of one of said salient poles is set as an origin, and a space angle indicative of the position on the outer periphery of the rotor is set to $\theta_2$, said rotor has a shape such that a gap permeance fluctuation is in proportion to $\cos(N\theta_2)$.

19. A transducer according to claim 17, wherein a first air gap length at one point on the outer periphery of said rotor constitutes a minimum air gap length, and a second air gap length at a point on the side opposite of a diameter which passes through said one point constitutes a maximum air gap length, thereby enabling the absolute position to be detected as a rotor shape corresponding to $N=1$.

20. A transducer according to claim 18, wherein a first air gap length at one point on the outer periphery of said rotor constitutes a minimum air gap length and a second air gap length at a point on the side opposite of a diameter which passes through said one point constitutes a maximum air gap length, thereby enabling the absolute position to be detected as a rotor shape corresponding to $N=1$.

21. An angular position transducer comprising:

a stator having exciting windings and output windings enclosed in slots formed in an iron core, said exciting windings having a first number of pole pairs, and said output windings having a second number of pole pairs different than said first number of pole pairs; and a rotor with no windings and which is constructed by only an iron core having a number of salient poles equal to a difference between the first number of pole pairs and the second number of pole pairs;

wherein said angular position transducer has a combination of the exciting windings of two phases and the output winding of a single phase.

22. A transducer according to claim 21, wherein in the case where the center of one of said salient poles is set as an origin, and a space angle indicative of the position on the outer periphery of the rotor is set to $\theta_2$, said rotor has a shape such that a gap permeance fluctuation is in proportion to $\cos(N\theta_2)$.

23. A transducer according to claim 21, wherein a first air gap length at one point on the outer periphery of said rotor constitutes a minimum air gap length, and a second air gap length at a point on the side opposite of a diameter which passes through said one point constitutes a maximum air gap length, thereby enabling the absolute position to be detected as a rotor shape corresponding to $N=1$.

24. A transducer according to claim 22, wherein a first air gap length at one point on the outer periphery of said rotor constitutes a minimum air gap length and a second air gap length at a point on the side opposite of a diameter which passes through said one point constitutes a maximum air gap length, thereby enabling the absolute position to be detected as a rotor shape corresponding to $N=1$.

* * * * *